(12) United States Patent
Walton

(10) Patent No.: US 6,601,676 B2
(45) Date of Patent: Aug. 5, 2003

(54) SELF-LUBRICATING BALLSCREW

(75) Inventor: Dennis Frederick Walton, North Devon (GB)

(73) Assignee: Thomson Saginaw Ball Screw Company, LLC, Saginaw, MI (US)

( * ) Notice: Subject to any disclaimer, the term of this patent is extended or adjusted under 35 U.S.C. 154(b) by 34 days.

(21) Appl. No.: 09/745,052

(22) Filed: Dec. 20, 2000

(65) Prior Publication Data

US 2001/0018850 A1 Sep. 6, 2001

(30) Foreign Application Priority Data

Dec. 22, 1999 (GB) .............................................. 9930356

(51) Int. Cl.[7] .............................................. F16N 15/00
(52) U.S. Cl. ....................... 184/99; 74/424.71; 74/89.44
(58) Field of Search .............................. 74/424.71, 89.4, 74/89.44; 184/99, 100

(56) References Cited

U.S. PATENT DOCUMENTS

| | | | | |
|---|---|---|---|---|
| 2,757,548 A | * | 8/1956 | Smith et al. .............. 74/424.71 |
| 5,168,767 A | * | 12/1992 | Morita .................... 74/424.71 |
| 5,906,136 A | | 5/1999 | Yabe et al. |
| 6,023,991 A | * | 2/2000 | Yabe et al. .................... 74/459 |
| 6,119,813 A | * | 9/2000 | Yabe et al. ............. 184/100 X |
| 6,216,821 B1 | * | 4/2001 | Namimatsu et al. .......... 184/99 |
| 6,338,285 B2 | * | 1/2002 | Tsukada et al. ............ 74/89.44 |

* cited by examiner

Primary Examiner—David A. Bucci
Assistant Examiner—Colby Hansen
(74) Attorney, Agent, or Firm—Reising, Ethington, Barnes, Kisselle & Learman, P.C.

(57) ABSTRACT

A self-lubricating ballscrew has a screwshaft and a ballnut surrounding the screwshaft and provided with a re-circulating path for a plurality of balls which roll between the ballnut and the screwshaft when the ballscrew is in use. Lubrication means are in contact with the helical groove of the screwshaft to provide lubrication therefor. The self-lubricating means comprises a lubricant impregnated solid having an elongate portion which follows the path of and is received in the helical groove of the screwshaft. The cross-section of that portion is different from that of the said groove, so that the contact region between the said portion and the said groove coincides with the lines of contact between the balls and the screwshaft. The deposit of lubricant is thereby concentrated on those lines.

11 Claims, 2 Drawing Sheets

US 6,601,676 B2

SELF-LUBRICATING BALLSCREW

FIELD OF THE INVENTION

The present invention claims the priority of United Kingdom patent application Serial No. 9930356.2 filed Dec. 22, 1999 and relates to a self-lubricating ballscrew comprising a screwshaft, a ballnut surrounding the screwshaft and provided with a re-circulating path for a plurality of balls which roll between the ballnut and the screwshaft when the ballscrew is in use, and lubrications means in contact with the helical groove of the screwshaft to provide lubrication therefor.

The present invention seeks to provide a remedy for one or more of these drawbacks.

SUMMARY OF THE INVENTION

Accordingly, the present invention is directed to a lubricating ballscrew as set out in the opening paragraph of the present specification, in which the self-lubricating means comprises a lubricant impregnated solid having an elongate portion which follows the path of and is received in the helical groove of the screwshaft, the cross-section of that portion being different from that of the said groove, so that the contact region between the said portion and the said groove coincides with the lines of contact between the balls and the screwshaft, and the deposit of lubricant is concentrated on those lines.

Preferably, the said portion has a section which is at least in part polygonal, for example rectangular or square, the cross-section of the groove being a curve, for example semi-circular in shape.

Advantageously, to balance the lubricating effect of the lubrication means against the friction it causes, the length of the said portion corresponds to substantially one pitch of the helical groove.

Advantageously, the lubrication means are secured to the ballnut.

At least a portion of the lubricating means may be received between the ballnut and the screwshaft.

A desired pressure of the lubricating means against the screwshaft may be obtained if the lubricating means comprise two semi-cylindrical segments, each having one end retained within the ballnut between the ballnut and the screwshaft and another end projecting outwardly from the ballnut in an axial direction along the screwshaft, the segments being urged towards one another by spring means.

Such lubricating means may be provided at both ends of the ballnut.

BRIEF DESCRIPTION OF THE DRAWING

An example of a self-lubricating ballscrew made in accordance with the present invention is illustrated in the accompanying drawings, in which.

DETAILED DESCRIPTION OF THE DRAWINGS

Figure 1:
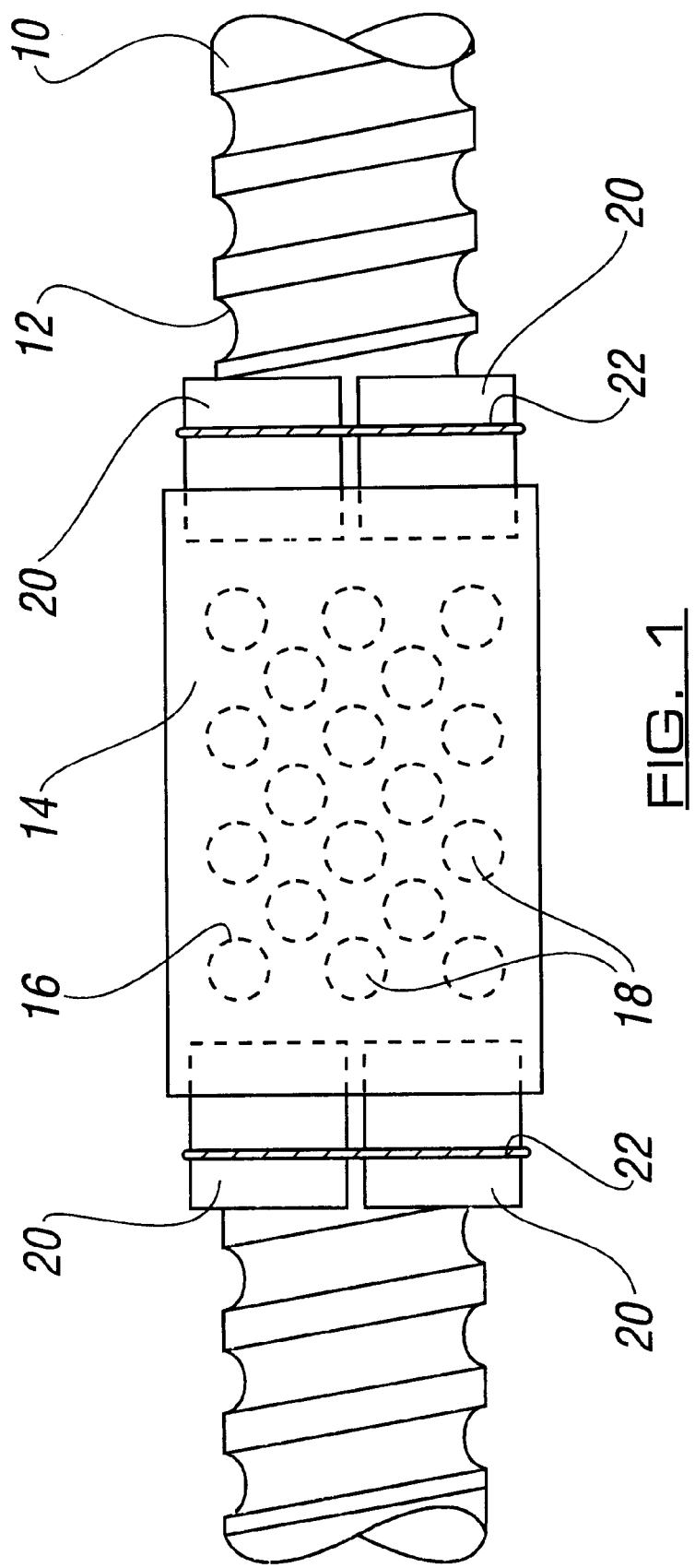
FIG. 1 shows a side view of the ballscrew.

The ballscrew shown in FIG. 1 comprises a screwshaft 10 provided with a helical groove 12 around its outside, and a ballnut 14 surrounding the screwshaft 10 and provided with a re-circulating path 16 in its interior. Balls 18 are provided within the ballnut in the re-circulating path and in engagement with the helical groove 12 of the screwshaft.

Two pairs of semi-cylindrical lubricant impregnated polymer segments 20 are provided, one at each end of the ballnut 14.

Each pair of segments 20 is arranged to surround the screwshaft 10, with respective ends of each segment received within that end of the ballnut 14 between the ballnut ,4 and the screwshaft 10. The remainder of each segment of the pair 20 extends axially outwardly away from the ballnut 14 Those ends of the segments 20 which are outside of the ballnut 14 are urged towards one another by means of a circular spring 22.

Figure 2:
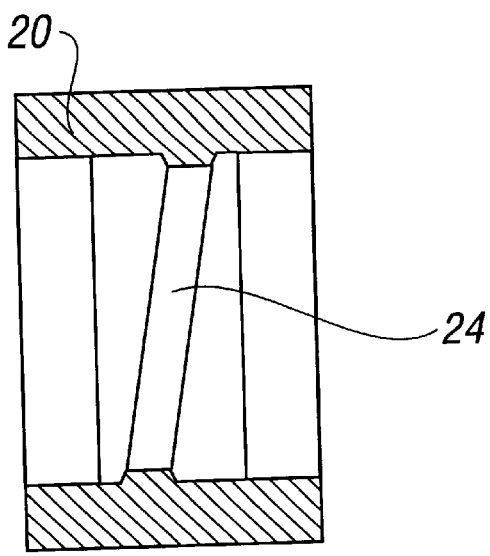
FIG. 2 shows an underneath view of a segment of the lubricating means of the ballscrew shown in FIG. 1.
Figure 3:
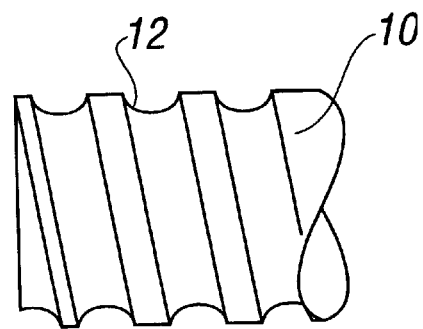
FIG. 3 shows a portion of the screwshaft of the ballscrew shown in FIG. 1.
Figure 4:
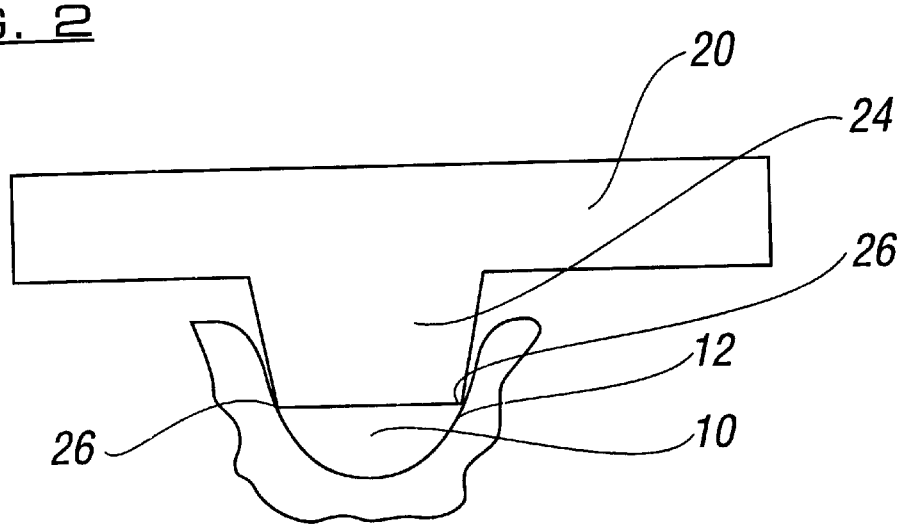
FIG. 4 shows diagrammatically a cross-sectional view of a portion of the lubricating means where it contacts a helical groove of the screwshaft of the ballscrew shown in FIG. 1.
Figure 5:
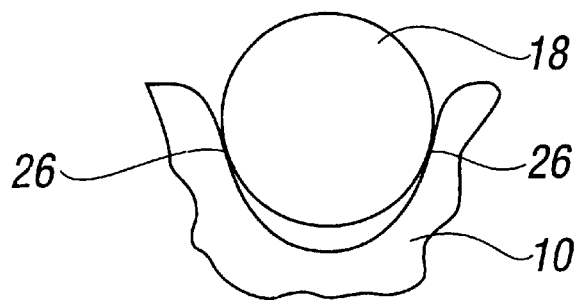
FIG. 5 shows a cross-sectional view through a ball engaging a groove of the screwshaft of the ballscrew shown in FIG. 1.

Each segment 20 has an interior surface as shown in FIGS. 2 and 4. In particular, it has an elongate portion 24 which projects inwardly from the main body of the segment 20, and which follows the path of a portion of the helical groove 12 and is received therein. As is shown more clearly in FIG. 4, the cross-section of the portion 24 is generally polygonal, in this case substantially rectangular in shape, whereas the cross-section of the groove 12 is generally semi-circular. As a result, the region of contact between a segment 20 and the groove 12, where lubricant is deposited thereon, is substantially only in the region of the contact lines 26 corresponding to the contact lines 26 between the balls 18 and the groove 12.

Each segment 20 has a portion 24 which corresponds in length to half a pitch of the groove 12, so that each pair has portions corresponding in length in total to substantially one pitch of the groove 12.

Numerous variations and modifications to the illustrated construction of ballscrew may occur to the reader without taking the resulting construction outside the scope of the present invention. To give one example only, the segments 20 may be made shorter in actual length and retained wholly within the ballnut 14. The circular spring 22 may be a close wound wire spring, such as is commonly used in shaft lip seals. The polymer segments 20 may comprise the material sold under the trade name MICROPOLY, manufactured by Phymet Inc., of 820 Pleasant Valley, P.O. Box 486, Springboro, Ohio 45066, United States of America.

I claim:

1. A self-lubricating ballscrew assembly comprising an axially extending screwshaft having a helical thread defining a helical groove; a ballnut surrounding the screwshaft and provided with a re-circulating path; a plurality of balls having a predetermined diameter which roll in said path between the ballnut and said groove of the screwshaft when the ballscrew is in use; said helical groove comprising in cross section an entrance throat section of greater axial width than the diameter of said balls communicating with an arcuate radially inner ball receiving section having a bottom and having an axial width, in a portion spaced radially from said bottom, substantially equal to the said diameter of said balls to form a line contact surface on each axial side of said arcuate section of said groove limiting further radially inward travel of said balls; and a self-lubricating lubrication device in contact with the helical groove of the screwshaft to provide lubrication, wherein the self-lubricating device comprises a lubricant impregnated solid having an elongate helical portion which follows the path of and is received in the said arcuate section of the helical groove of the screwshaft, the cross-section of said elongate helical portion of the said solid providing axially spaced line contact surfaces axially spaced to correspond with said diameter of said balls received within said groove, so that the said line contact portions on said elongate portion essentially coincide with the lines of contact between the balls and the groove of said screwshaft, and the deposit of lubricant is concentrated on said lines of contact.

2. A self-lubricating ballscrew according to claim 1, wherein the said elongate portion has a section which is at least in part polygonal, the cross-section of said arcuate section being a curve.

3. A self-lubricating ballscrew according to claim 2, wherein the said elongate portion has a section which is at least in part rectangular.

4. A self-lubricating ballscrew according to claim 2, wherein the said elongate portion has a section which is at least in part square.

5. A self-lubricating ballscrew, according to claim 2, wherein the cross-section of said arcuate section of said groove is substantially semi-circular in shape.

6. A self-lubricating ballscrew, according to claim 1, wherein the length of the said elongate portion corresponds to substantially one pitch of the helical groove.

7. A self-lubricating ballscrew, according to claim 1, wherein the lubrication device is secured to the ballnut.

8. A self-lubricating ballscrew, according to claim 1, wherein at least a portion of the lubricating device is received between the ballnut and the screwshaft.

9. A self-lubricating ballscrew, according to claim 1, wherein the lubricating device comprises two semi-cylindrical segments, each have one end retained within the ballnut between the ballnut and the screwshaft and another end projecting outwardly from the ballnut in an axial direction along the screwshaft, the segments being urged towards one another by spring means.

10. A self-lubricating ballscrew, according to claim 9, wherein such lubricating segments are provided at both ends of the ballnut.

11. A self-lubricating ball screw, according to claim 1, wherein said self-lubricating device is radially spaced from said screw helical thread.

* * * * *